July 21, 1970   F. L. J. JARVIS   3,520,985
BULKHEAD TEST LEAD ENTRY
Filed May 10, 1968
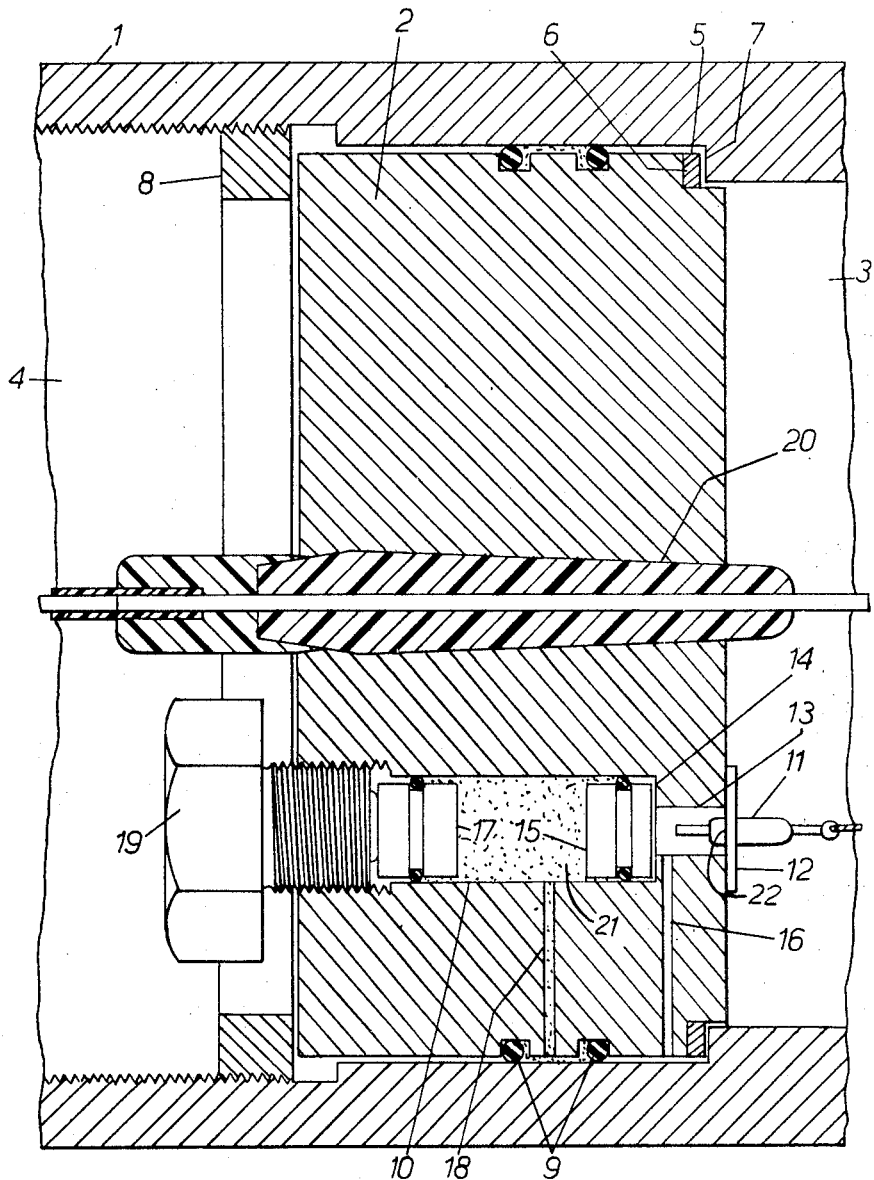
Inventor
FRANK L. J. JARVIS
By Edward Goldberg
Attorney United States Patent Office 3,520,985
Patented July 21, 1970

3,520,985
BULKHEAD TEST LEAD ENTRY
Frank Lewis John Jarvis, Gravesend, England, assignor to International Standard Electric Corporation, New York, N.Y., a corporation of Delaware
Filed May 10, 1968, Ser. No. 728,240
Claims priority, application Great Britain, May 11, 1967, 21,944/67
Int. Cl. H02g 15/14
U.S. Cl. 174—18                    9 Claims

ABSTRACT OF THE DISCLOSURE

A temporary test lead is provided in an existing channel through the bulkhead of electrical equalizer equipment for submarine cables. The opening is sealed after the lead is removed.

BACKGROUND OF THE INVENTION

Field of the invention

This invention relates to bulkheads for submersible housings for telecommunication equipment and in particular to arrangements for connecting leads for testing electrical equalizers during cable laying operations.

DESCRIPTION OF THE PRIOR ART

The equalization of a long submarine cable system involving many submerged repeaters in a difficult problem. The first of these difficulties resides in the fact that when a submarine cable is laid, its transmission characteristics change due to pressure, temperature and other effects. Thus final equalization of the system must be performed during the lay from measurements performed on that part of the system already laid. The second difficulty stated briefly is the length of time required to interpret the results of tests, to design and wire the required network, to seal the equalizer housing and to join the cable to the equalizer after test, in time for the equalizer to be laid, as the ship must not be stopped once the lay has started. The importance of cutting down the time required to prepare an equalizer for laying will therefore be apparent.

It has been the practice in the past, to leave an open joint prior to each equalizer in the lay and to use this joint for system measurement. The "making through" of this open joint after measurement is an operation which takes several hours.

To eliminate this operation it has previously been proposed to provide the equalizer bulkhead with a special test lead fitted prior to the cable laying operation by means of a cable entry similar to the two entries already provided to connect the equalizer to the sea cable. When, as the result of measurements made via the test lead, the equalizer has been readjusted, test lead is amputated and the stub is sealed off. This operation takes considerably less time than making through the open joint.

A serious drawback of this technique is that the additional cable entry and the stub seal represent two additional leakage paths into the housing. The provision is one of the bulkheads of the additional cable entry also presents certain manufacturing problems and increases its cost.

SUMMARY OF THE INVENTION

The object of the invention is to provide means to connect a temporary test lead for an equalizer or other electrical equipment in the housing which does not require the provision of either an additional cable entry, or a cable seal.

According to the invention there is provided in a bulkhead for a submersible housing for electrical equipment an arrangement for connecting temporarily a lead or leads to test said equipment and for sealing said connecting arrangement after removing said test lead or leads but prior to submersion, comprising a channel through said bulkhead, a gas tight electrical connector closing said channel at the end nearest to the equipment to be tested, a removable barrier inside said channel to protect said connector from hydrostatic pressure in said channel and closure means for the opposite end of the channel.

BRIEF DESCRIPTION OF THE DRAWING

The invention will now be described with reference to the accompanying drawing wherein the single figure shows a sectional view through the bulkhead and the lead connect arrangements.

DESCRIPTION OF THE PREFERRED EMBODIMENTS

As shown in the figure, the pressure housing is indicated by 1. Bulkhead 2 separates the central chamber 3 containing the equipment from the outer chamber 4. An annular gasket 5 of deformable material, for instance lead, is placed in the space between a shoulder 6 in the bulkhead and a shoulder 7 in the wall of the housing. When the clamping ring 8 is screwed against the bulkhead the gasket 5 is deformed by pressure between the shoulders and effects a gas tight seal. In the drawing the gasket is shown as it is before the bulkhead is pressed against the abutment by the clamping ring.

A hydraulic seal between the bulkhead and the housing is provided by O-rings 9 of resilient material, for example synthetic rubber, inserted in peripheral grooves in the outer surface of the bulkhead. As this hydraulic seal is between the cylindrical surfaces of the housing and bulkhead its sealing properties are not affected by axial movements of the bulkhead in the housing.

Although the main and hydraulic seals referred to above have been described and claimed in British Pat. Nos. 742,837 and 847,858 and U.S. Pat. No. 3,258,520, issued June 28, 1966 and assigned to the same assignee as the instant application, the essential features of the arrangements, suitably modified to describe the novel features, will be repeated as they are relevant to the present invention.

A channel 10, normally used for flushing the housing with dry gas and for pressurizing the hydrostatic seal, is provided through the bulkhead 2. In the present configuration, the end of the channel facing the central chamber 3 is closed by a gastight electrical lead through connection 11 which might be a plug or a socket. The side of the connector facing chamber 3 of the housing is connected by a suitable internal lead, partially shown, to the equipment to be tested. The opposite end of the connector terminates in a socket or plug 22 which detachably engages the plug or socket of the external test lead, not shown, during testing. The connector is provided with a metal flange 12 which is secured to the face of the bulkhead by welding or any other suitable process. Although the connector is of gastight construction it must be protected against the hydrostatic pressure when the housing is submersed. For this purpose part 13 of the channel adjacent to the central chamber has a smaller diameter than part 10 thus providing a shoulder 14. A piston 15 having a suitable gasket or an O-ring is inserted into channel 10 and forced against the shoulder 14, thereby providing a removable barrier which protects the connector from external pressure. The purpose of the channel 16 will be explained later. A second piston 17 is inserted at the opposite end of channel 10, the space between the two pistons, the channel 18 and the space between the two O-rings 9 being filled with a medium such as petroleum jelly 21. The jelly is compressed by exerting a force on the piston 17 by any suitable means, for example a screw 19. The main cable seal through the bulkhead is indicated by 20. Since the cable entry and gland are not part of the invention they are indicated schematically.

The process of sealing the housing after the testing has been completed, the external lead removed and the equalizer set to give the required characteristic, is as follows:

After the bulkhead is slid into the housing, but before the gas seal is compressed, the housing is flushed with dry gas, unless the readjustment of the equalizer has been performed in an air-conditioned enclosure. If flushing is required, dry gas at a relatively low pressure is applied to channel 10 by a suitable hose fitted in place of the screw 19. As at this stage pistons 15 and 17 are not yet in position, the dry gas flows via channel 16 and past the gas seal 5 into the inner chamber of the housing. The displaced atmosphere flows out through the bulkhead at the other end of the housing. After flushing, the gas seal 5 is compressed by tightening clamping ring 8. Piston 15 is now inserted into channel 10 and is held against shoulder 14. The remaining volume of channel 10 is filled with petroleum jelly. Piston 17 is now inserted and forced by screw 19 to compress the jelly in channel 10. The jelly is forced via channel 18 into the space between the O-rings 9 and provides a pressure seal to the bulkhead. In the arrangement described above there is no need to provide any additional cable entries, glands or seals other than those already provided in the bulkhead thereby reducing the cost of manufacture and also reducing the probability of developing a leak.

What is claimed is:

1. In a submersible housing for electrical equipment, an arrangement for connecting a detachable lead to test said equipment and for sealing said connecting arrangement after removing said test lead but prior to submersion, comprising a bulkhead closing one end of said housing and including a channel through said bulkhead, a gas tight electrical connector closing said channel at the end nearest to the equipment to be tested, means for detachably engaging a connecting lead within said channel to said connector at the end, a removable barrier inside said channel adjacent said connector and protecting said connector from hydrostatic pressure in said channel and closure means for the opposite end of the channel.

2. An arrangement as claimed in claim 1 in which the part of said channel which lies between said barrier and closure is filled with fluid for protection from hydrostatic pressure.

3. An arrangement as claimed in claim 2 in which said closure includes means to compress the fluid.

4. An arrangement as claimed in claim 3 in which the means to compress the fluid is a piston and the closure means includes a screw thread operated member exerting a pressure on the piston, and means providing a pressurized seal for said removable barrier and piston.

5. An arrangement as claimed in claim 4 including a pressurized seal between said bulkhead and housing and wherein a path is provided connecting the fluid filled part of the channel to said pressurized seal.

6. An arrangement as claimed in claim 5 including a gastight seal between said bulkhead and housing and wherein a path is provided connecting the part of the channel adjacent said connector to a portion between said bulkhead and housing which is protected by said barrier and said gastight seal.

7. An arrangement as claimed in claim 5 in which the fluid which fills the channel applies pressure to said seal.

8. An arrangement as claimed in claim 3 wherein the end of said channel adjacent said connector has a smaller diameter than the portion between said barrier and closure, said barrier being positioned against said smaller diameter end.

9. An arrangement as claimed in claim 1 including a main cable passing through another portion of said bulkhead and sealing means surrounding said main cable.

References Cited

UNITED STATES PATENTS

| 1,706,140 | 3/1929 | Brand | 174—18 X |
| 1,731,597 | 10/1929 | Spear | 174—152 X |
| 2,840,262 | 6/1958 | Learmonth et al. | |
| 2,914,599 | 11/1959 | Clarke et al. | |

FOREIGN PATENTS 847,858   9/1960   Great Britain.

LARAMIE E. ASKIN, Primary Examiner

U.S. Cl. X.R.

174—11, 70